May 15, 1945. C. MOON 2,375,938

DIFFERENTIAL CONTROL MECHANISM

Filed April 2, 1943

Inventor
Carl Moon
By
Attorney

Patented May 15, 1945

2,375,938

UNITED STATES PATENT OFFICE 2,375,938

DIFFERENTIAL CONTROL MECHANISM

Carl Moon, Detroit, Mich.

Application April 2, 1943, Serial No. 481,533

2 Claims. (Cl. 74—315)

Differential gears are used on most automobiles. Under some conditions, particularly where one wheel is on a slippery surface so as to provide practically no traction, that wheel, through the differential, merely spins even though the other wheel may be on a surface giving fair traction.

The present invention is designed to control the differential to prevent complete freedom of one side so as to permit the spinning of that wheel without any particular traction on the opposite wheel. Features and details of the invention will appear from the specification and claims.

Figure 1:
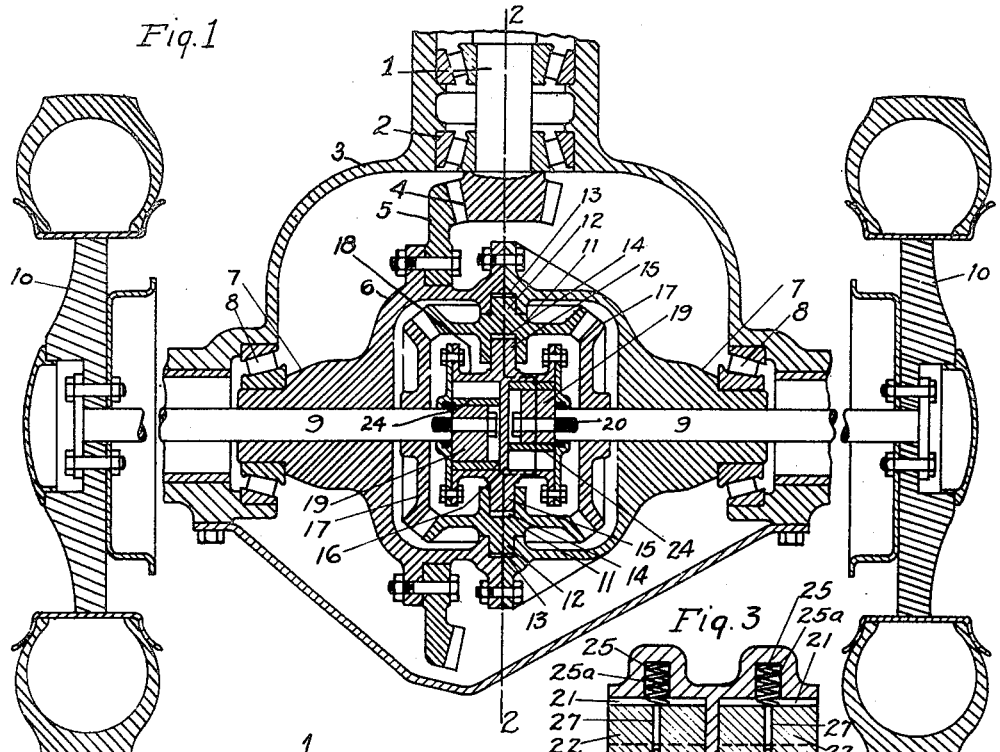
Figure 2:
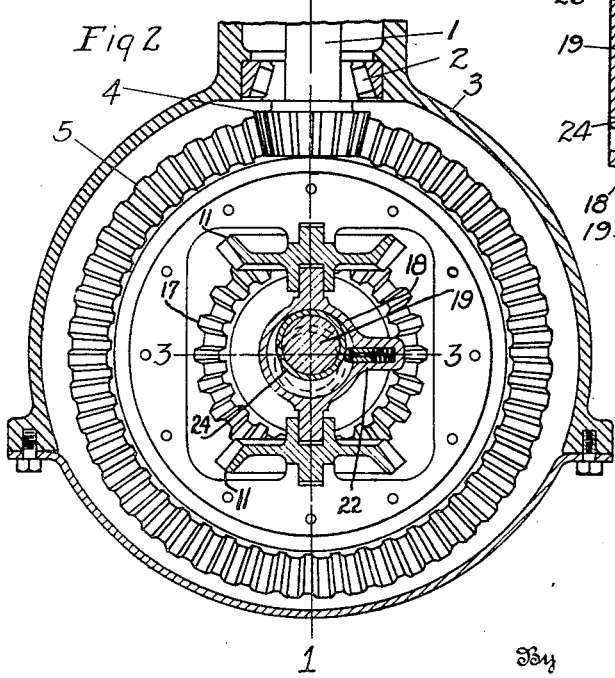

A preferred embodiment of the invention is illustrated in the accompanying drawing as follows:

Fig. 1 shows a section on the line 1—1 in Fig. 2.

Fig. 2 a section on the line 2—2 in Fig. 1.

Fig. 3 an enlarged section of the forcing chamber on the line 3—3 in Fig. 2.

Fig. 4 an enlarged view of the chamber on the line 2—2 in Fig. 1.

1 marks a propeller shaft, 2 a bearing of the propeller shaft, the bearing being in the differential case 3. A gear 4 is fixed on the propeller shaft and meshes with a ring gear 5. The ring gear is secured to a supporting housing 6 which has a bearing extension 7, these extensions being carried by bearings 8 in the case 3.

Axles 9 have the usual bearings and supports, and wheels 10 are secured to the axles in the usual manner. Floating connecting gears 11 have trunnion extensions 12 which extend into bearings 13 in the housing 6. The gears 11 also have bearing sockets 14 which receive trunnions 15 of a retarding mechanism for retarding excessive differential movement. The connecting gears 11 mesh with gears 17, which gears are fixed on the axles.

The trunnions 15 extend from a case 16 which is carried by the trunnions. The case is provided with chambers having cylindrical outer walls 18. Eccentrics 19 having cylindrical walls are arranged in the chamber and are secured on the ends of the axle by screws 20. The case is provided with radially extending slots 21 in which impeller blades 22 are slidingly mounted. The blades extend into joint sockets 23 in sleeves 24, the sleeves being rotatively mounted on the eccentrics 19. Springs 25 are arranged in sockets 25a in the case 16 and yieldingly force the impeller blades into closing contact with the sockets 21.

A restricted opening 26 extends through the impeller blades connecting the forcing side and the receiving side of the forcing chamber. In order to maintain a substantially uniform volume of space for the liquid, passages 27 connect the openings 26 with the spring sockets 25a.

This hydraulic forcing mechanism is common structure for rotary pumps and the like. The space in front of the impeller is decreased as the impeller advances. On the other hand, the space back of the impeller is increased. The restricted opening 26 between these two sides of the impeller control, through the acceleration necessary to permit of a relative rotative movement of the outer wall and inner wall of the chamber, determines the retarding effect of the mechanism. These openings should be so proportioned that normal running of the automobile and the differential movement incident to turning corners will be retarded very little, but it should be small enough so that where one wheel has practically no traction and the other has some, the wheel without the traction is prevented from spinning by reason of the retarding effect of the liquid forcing devices. Thus it is possible through a considerable acceleration to get nearly complete traction on the wheel that has some driving engagement with the road.

What I claim as new is:

1. In combination with the axles of an automobile and a differential for the axles comprising axle gears, a connecting gear meshing with the axle gears, a rotative mounting for the connecting gear permitting orbital movement of the connecting gear, and means driving the mounting; of a liquid forcing mechanism having a chamber with cylindrical outer and inner walls, one wall being locked with the mounting and the other with an axle, said walls being eccentric and forming a closure at one point in the circumference, and an impeller radially movable in one of the walls and adapted to maintain closure between the walls said impeller having a restricted opening connecting the portions of the chamber at each side of the impeller.

2. In combination with the axles of an automobile and a differential for the axles comprising axle gears, a connecting gear meshing with the axle gears, a rotative mounting for the connecting gear permitting orbital movement of the connecting gear, and means driving the mounting; of a liquid forcing mechanism having a chamber with cylindrical outer and inner walls, one wall being locked with the mounting and the other with an axle, said walls being eccentric and forming a closure at one point in the circumference; an impeller radially movable in one of the walls and adapted to maintain closure between the walls, one of the walls being provided with a socket in which the impeller is slidingly mounted, said impeller having a restricted opening connecting the portions of the chamber at each side of the impeller, and a passage leading through the impeller from the restricted opening to the socket.

CARL MOON.